Nov. 20, 1934.   M. CRANE   1,981,720
VALVE FOR FOOTBALL BLADDERS AND THE LIKE
Filed May 14, 1931
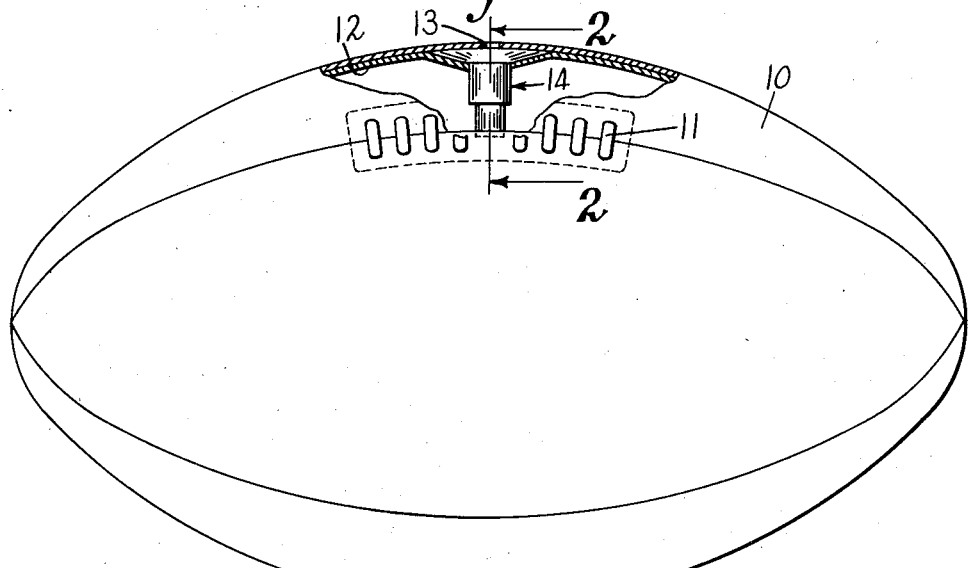
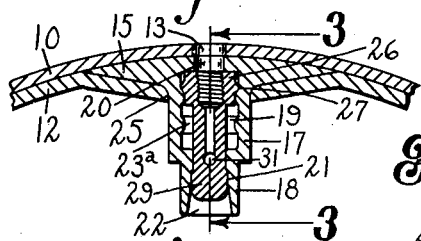
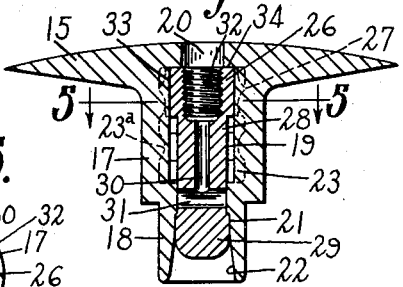
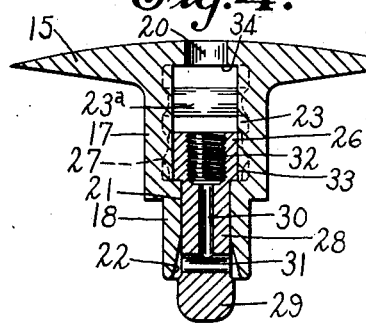
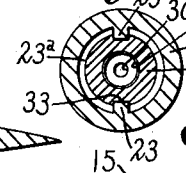
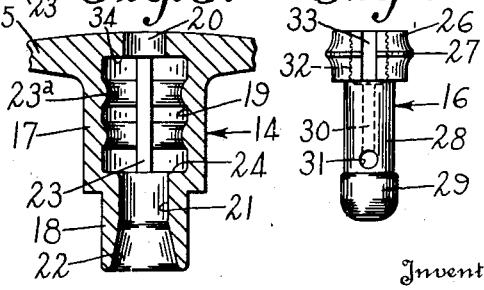
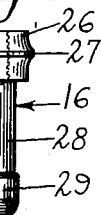
Inventor
Myrick Crane
By Rockwell + Bartholow
Attorneys Patented Nov. 20, 1934

1,981,720

UNITED STATES PATENT OFFICE 1,981,720

VALVE FOR FOOTBALL BLADDERS AND THE LIKE

Myrick Crane, New Haven, Conn., assignor to The Seamless Rubber Company, Incorporated, New Haven, Conn.

Application May 14, 1931, Serial No. 537,329

15 Claims. (Cl. 273—65)

This invention relates to valve structures for inflatable bladders such for example as bladders for footballs, basketballs and the like, and is applicable as well to inflatable balls of various types whether or not the inflatable structure is designed to be disposed within a cover. The invention is illustrated, however, in connection with a football, but it will be understood that it is not to be limited to this use.

One object of the invention is the provision of a valve structure for inflatable balls or bladders such that air may be introduced therein with facility and after the operation has been completed the opening through which the air enters may be effectually and easily closed.

Another object of the invention is the provision of an inflatable ball or bladder provided with a self-sealing inflating structure, which may be manipulated to allow free entry of air therein, and also to seal the opening against the egress of air, and which structure will at the same time be of simple and economical construction having few parts, and which will be unlikely to get out of order or to need repair.

More specifically the invention resides in providing an inflatable ball of this character with a filler neck extending into the ball and a filler tube or valve tube movably mounted in the neck and of such construction that in one position the entry of air into the ball is permitted, while in another position the ball will be sealed against leakage.

To these and other ends, the invention consists in the novel features and combinations of parts to be hereinafter described and claimed.

In the accompanying drawing:

Fig. 1 is a view of a football provided with a bladder embodying my invention;

Fig. 2 is a sectional view through the cover of the ball and the filler neck of the bladder on line 2—2 of Fig. 1;

Fig. 3 is a sectional view of the valve structure taken on line 3—3 of Fig. 2 and showing the valve or filler tube in raised position;

Fig. 4 is a view similar to Fig. 3 but showing the valve or filler tube in its lower position;

Fig. 5 is a sectional view on line 5—5 of Fig. 3;

Fig. 6 is a sectional view of the filler neck, the valve tube being omitted, and Fig. 7 is an elevational view of the valve tube or filler tube.

To illustrate a preferred embodiment of my invention I have shown a football comprising a cover 10 having the usual lacing 11 and an inflatable bladder 12 within the cover. The cover is provided with an opening 13 which preferably is spaced from the lacing 11 and through which may be introduced a pump connection to inflate the bladder as will be hereinafter explained.

The valve structure comprises a filler neck 14 having an upper disk-like portion 15 and a filler tube or valve tube 16 which is movably mounted within the filler neck.

As shown more particularly in Fig. 6, the filler neck is provided below the disk 15 with a body 17 and a reduced end portion 18. The body portion 17 is provided with a relatively large cavity or bore 19 in communication with which is an opening 20 through the disk 15. Below the cavity 19 is a bore 21 opening through the lower end of the filler neck and there communicating with the interior of the bladder or inflatable ball.

At its lower end the bore 21 is flared outwardly as shown at 22 so as to be slightly larger adjacent its lower open end, as clearly shown in Fig. 6. As illustrated, this is obtained by interiorly beveling the wall of the end portion 18.

The bore or cavity 19 of the filler neck is provided with a pair of diametrically opposed longitudinally extending ribs 23 which project inwardly from the wall thereof, and is also provided with annular ribs or ridges 23ª, the function of which will be explained hereinafter. As the bore 21 is smaller than the cavity 19 an annular shoulder 24 is provided at the lower end of the latter. As shown in Fig. 2, the bladder 12 is formed with an opening 25 through which projects the filler neck 14, the material of the bladder about this opening being secured in any desired manner such as cementing or the like to the lower surface of the disk 15, so as to make an air-tight connection between the parts.

The valve tube or filler tube 16 comprises an enlarged head portion 26 provided with an annular rib 27 on an intermediate portion thereof and a lower body portion 28 terminating in a somewhat enlarged end 29. The body portion 28 is provided with a longitudinal passage 30 terminating at its lower end in a transverse passage 31 which opens through the wall of the tube above the enlarged end 29. At its upper end the passage 30 communicates with an internally threaded counterbore 32 in the head 26 which opens through the upper end of the head. The head 26 is also provided with longitudinally extending grooves 33 at diametrically opposite points which receive the ribs 23 provided within the neck 14 as heretofore described.

The tube 16 is disposed within the filler neck 14 with the head 26 lying within the enlarged cavity 19. The height of this cavity is considerably greater than that of the head so that, as will be apparent from inspection of Figs. 3 and 4, the tube is permitted considerable movement within the neck. When the tube is in its upper position, as shown in Fig. 3, the upper edge of the head 26 lodges against the shoulder 34 at the upper end of the cavity 19. In this position the rib or corrugation 23ª on the interior wall of the filler neck lies below the rib 27 on the head 26 of the filler tube so that the latter is releasably held in its uppermost position. It will be apparent that in this position the ends of the transverse opening 31 are closed by the wall of the opening 21 and moreover the enlarged end 29 fits tightly within this opening so as to seal it effectively.

When the filler tube 16 is moved downwardly to its lower position, as shown in Fig. 4, the rib 27 lies below the lower rib 23ª in the cavity 19 and the lower surface of the head 26 rests against the shoulder 24. In this position the transverse opening 31 communicates with the interior of the bladder as it lies within the flared portion 22 of the opening 21 and the ball may be inflated.

The operation of the device is as follows. If it is desired to inflate the ball, the attaching end or the adapter of an air pump is threadedly engaged with the threads of the counterbore 32 of the filler or valve tube. This end of the pump or adapter is, for this purpose, inserted through the opening 13 in the cover and through the opening 20 in the disk 15, for it will be understood that when the bladder is used in connection with a football, for example, the bladder will be secured in place within the cover so that the opening 20 registers with the opening 13. This securing of the bladder in place may be effected by cementing the disk 15 to the inner surface of the cover. The filler tube is then pushed downwardly to its lower position, as shown in Fig. 4, wherein the longitudinal passage 30 and the transverse passage 31 will be in communication with the interior of the bladder. The latter may then be inflated by operating the pump, and when this operation is complete, the valve tube 16 is then pulled upwardly to the upper position shown in Fig. 3 by means of the pump connection. The pump may then be unscrewed, the valve tube being held against turning movement by engagement of the ribs 23 within the longitudinal slots 33. The valve tube will be held in this upper position due to the engagement of the upper rib 23ª of the filler neck below the rib 27 on the head of the valve tube, and as heretofore explained, the ends of the transverse passage 31 will be closed by the inner wall of the passage 21, and the enlarged end 29 of the valve tube will effectually seal the lower portion 18 of the filler neck so that no leakage will occur from the inflated ball.

It will be obvious that when the opening 13 is spaced from the lacing of the ball, the bladder may be filled without the necessity of unlacing.

The filler neck 14 will preferably be made of soft rubber or some similar relatively flexible and pliable material and the filler tube 16 may be conveniently made of hard rubber for example. It will be apparent that, as the filler neck extends into the bladder, the compressed air therein when the bladder is inflated will tend to press the wall of the filler neck tightly against the filler tube so that the bladder will be sealed against leakage.

While I have shown and described a preferred embodiment of my invention, it will be understood that it is not to be limited to all of the details shown, but is capable of modification and variation within the spirit of the invention and within the scope of the appended claims.

What I claim is:

1. An inflating structure for inflatable balls comprising a flexible neck member secured to the ball and extending thereinto and having an opening therethrough, and a filler member slidably mounted in said opening and having a passage therein opening through the side thereof, said filler member being movable to a position in which one end thereof projects from said neck into the ball whereby said lateral opening in the filler member will be uncovered, said filler member having an enlarged end thereon below said lateral opening to seal the opening in the neck when the filler member is drawn therein, said neck member having a skirt portion at its lower end to be forced against the filler member by the air pressure within the ball.

2. An inflatable ball having an inflating means comprising a disk portion secured to the ball and a hollow neck projecting within the ball, said neck being provided with an opening therethrough, a filler member movably mounted in said neck, said member being provided with a longitudinal passage and a transverse passage communicating with said longitudinal passage and opening through the wall of said member, an enlarged end on said member below the transverse passage, said filler member being movable to an outer position within the neck wherein said enlarged end seals the opening of the neck, and being movable to an inner position wherein the enlarged end projects from the neck, and said lateral opening communicates with the interior of the ball, and said filler member having means for connection with an inflating tool, and cooperating means on said filler member and said neck to prevent relative rotation therebetween.

3. An inflatable ball having an inflating means comprising a disk portion secured to the ball and a hollow neck projecting within the ball, said neck being provided with an opening therethrough, a filler member slidably mounted in said neck, said member being provided with a longitudinal passage and a transverse passage communicating with said longitudinal passage and opening through the wall of said member, an enlarged end on said member below the transverse passage, said filler member being movable to an outer position within the neck wherein said enlarged end seals the opening of the neck, and being movable to an inner position wherein the enlarged end projects from the neck, and said lateral opening communicates with the interior of the ball, means to prevent rotation of the filler member within the filler neck and said filler member having means at its outer end for connection with an inflating pump.

4. An inflatable ball having an inflating structure comprising a disk-like member secured to the ball at the surface thereof and a flexible filler neck extending within the ball, said filler neck being provided with an enlarged cavity, a restricted passage extending from said cavity through the inner end of the neck, and said disk member being provided with a restricted opening leading into said cavity, a filler member provided with an enlarged head movably mounted in said cavity, and a smaller body portion extending into the passage in said neck, and said filler member being provided with a longitudinal passage opening through the upper end thereof and through a lateral wall of the body portion at the lower end of the passage, and said member having an enlarged portion below the lateral opening to seal the passage leading through the end of the filler neck.

5. An inflatable ball having an inflating structure comprising a disk-like member secured to the ball and a flexible filler neck extending within the ball, said filler neck being provided with an enlarged cavity and shoulder portions at the ends of said cavity, a passage extending from said cavity through the inner end of the neck, and said disk member being provided with an opening leading into said cavity, a filler member provided with an enlarged head movably mounted in said cavity and limited in its movement by said shoulders, and a body portion extending into the passage in said neck, and said filler member being provided with a longitudinal passage opening through the upper end thereof and through a lateral wall of the body portion at the lower end of the passage, and said member having an enlarged portion below the lateral opening to seal the passage leading through the end of the filler neck, and cooperating means on the wall of said cavity in the neck and on the head of the filler member to releasably hold the latter in a predetermined position.

6. An inflatable ball having an inflating structure comprising a disk-like member secured to the ball and a filler neck extending within the ball, said filler neck being provided with an enlarged cavity, a passage extending from said cavity through the inner end of the neck, and said disk member being provided with an opening leading into said cavity, a filler member provided with an enlarged head slidably mounted in said cavity, and a body portion extending into the passage in said neck, said filler member being provided with a longitudinal passage opening through the upper end thereof and through a lateral wall of the member at the lower end of the passage, and said member having an enlarged portion below the lateral opening to seal the passage leading through the end of the filler neck, cooperating means on the wall of said cavity in the neck and on the head of the filler member to releasably hold the latter in a predetermined position, and means to prevent relative rotation between said filler member and said filler neck.

7. An inflating structure for an inflatable ball comprising a neck member substantially flush with the surface of the ball at its outer end and projecting into the ball and having an enlarged cavity therein and restricted passages leading from said cavity through the upper and lower ends of the member providing shoulders at the upper and lower ends of the cavity, a filler member movably mounted in the neck member and having an enlarged head disposed in said cavity, said head being held against movement by said shoulders, said filler member having a longitudinal passage leading through the upper end thereof and a transverse passage communicating with said longitudinal passage adjacent its lower end, and said filler member being slidable in said neck member to an upper position wherein the transverse passage is covered by the material of the neck member, and to a lower position wherein said transverse passage communicates with the interior of the ball.

8. An inflating structure for inflatable balls comprising a neck member secured to the ball and projecting thereinto, said neck member having an enlarged cavity therein and restricted passages leading from said cavity through the ends of said member, a filler member movably mounted within the neck member and having a passage leading through its upper end, said passage communicating at its lower end with the interior of the ball in one position of said member, said member having an enlarged head portion disposed within said cavity, and cooperating means on said head and the wall of the cavity to prevent rotation of the filler member with respect to the neck member.

9. An inflating structure for inflatable balls comprising a neck member secured to the ball and projecting thereinto, said neck member having an enlarged cavity therein and restricted passages leading from said cavity through the ends of said member, a filler member movably mounted within the neck member and having a passage leading through its upper end, said passage communicating at its lower end with the interior of the ball in one position of said member, said member having an enlarged head portion disposed within said cavity and restricted against movement from said cavity, the wall of said cavity having laterally projecting ribs thereon, and said ribs engaging the head of said filler member to releasably retain the latter in a given position.

10. An inflating structure for inflatable balls comprising a neck member secured to the ball and projecting thereinto, said neck member having an enlarged cavity therein and restricted passages leading from said cavity through the ends of said member, a filler member movably mounted within the neck member and having a passage leading through its upper end, said passage communicating at its lower end with the interior of the ball in one position of said member, said member having an enlarged head portion disposed within said cavity and restricted against movement from said cavity, the wall of said cavity being provided with a laterally projecting rib, and said head being provided with a laterally projecting rib to be engaged by the rib on the wall.

11. An inflating structure for inflatable balls comprising a neck member secured to the ball and projecting thereinto, said neck member having an enlarged cavity therein and restricted passages leading from said cavity through the ends of said member, a filler member movably mounted within the neck member and having a passage leading through its upper end, said passage communicating at its lower end with the interior of the ball in one position of said member, said member having an enlarged head portion disposed within said cavity, the wall of said cavity being provided with a laterally projecting rib, said head being provided with a laterally projecting rib to be engaged by the rib on the wall, and said head being provided with a longitudinal groove, and the wall of said cavity being provided with a longitudinal rib to engage in said groove and prevent relative rotation of the parts.

12. An inflating structure for an inflatable ball comprising a bottomless hollow neck member having a through passage opening through the outer end, said neck member being of flexible material and extending into the ball, a filler member slidably mounted in said neck member and lying below the upper surface of said neck member, said filler member being provided with an air passage opening laterally through the wall thereof into the ball in one position of the filler member and sealed from the interior of the ball in another position thereof, and means to restrict inward movement of said filler member.

13. An inflating structure for an inflatable ball comprising a bottomless hollow neck member having a through passage opening through the outer end, said neck member being of flexible material and extending into the ball, a filler member slidably mounted in said neck member and lying below the upper surface of said neck member, said filler member being provided with an air passage opening laterally through the wall thereof into the ball in one position of the filler member and sealed from the interior of the ball in another position thereof, and said neck member having a skirt portion at the lower end thereof subjected to the air pressure in the ball and urged thereby into tight contact with the filler member.

14. An inflating structure for an inflatable ball comprising a hollow neck member having a through passage opening through the inner end, said neck member being of flexible material and extending into the ball, a filler member slidably mounted in said neck member and lying below the upper surface of said neck member, said filler member being provided with an air passage opening laterally through the wall thereof in one position of the filler member and sealed from the interior of the ball in another position thereof, and said filler member being movable to a position wherein one end projects from the opening at the inner end of the neck whereby said lateral opening in the filler member communicates with the interior of the ball.

15. An inflating structure for an inflatable ball comprising a hollow neck member having a through passage opening through the inner end, said neck member being of flexible material and extending into the ball, a filler member slidably mounted in said neck member and lying below the upper surface of said neck member, said filler member being provided with an air passage opening laterally through the wall thereof into the ball in one position of the filler member and sealed from the interior of the ball in another position thereof, and means to prevent rotation of said filler member within the neck.

MYRICK CRANE.